(12) United States Patent
Hawkins

(10) Patent No.: US 7,708,202 B2
(45) Date of Patent: May 4, 2010

(54) SYSTEM AND METHOD FOR FACILITATING SALES UTILIZING CUSTOMER RELATIONSHIP MANAGEMENT TECHNOLOGY

(75) Inventor: Stan Hawkins, Snellville, GA (US)

(73) Assignee: Reflexis Systems, Inc., Dedham, MA (US)

( * ) Notice: Subject to any disclaimer, the term of this patent is extended or adjusted under 35 U.S.C. 154(b) by 1133 days.

(21) Appl. No.: 11/324,130

(22) Filed: Dec. 30, 2005

(65) Prior Publication Data
US 2007/0152041 A1    Jul. 5, 2007

(51) Int. Cl.
*G06F 19/00* (2006.01)
(52) U.S. Cl. .................. 235/385; 235/383; 235/472.02
(58) Field of Classification Search ............... 235/383, 235/385, 472.01, 472.02
See application file for complete search history.

(56) References Cited

U.S. PATENT DOCUMENTS

| | | |
|---|---|---|
| 5,644,723 A | 7/1997 | Deaton et al. |
| 5,677,955 A | 10/1997 | Doggett et al. |
| 5,737,701 A | 4/1998 | Rosenthal et al. |
| 5,774,551 A | 6/1998 | Wu et al. |
| 5,794,259 A | 8/1998 | Kikinis |
| 5,815,665 A | 9/1998 | Teper et al. |
| 5,855,007 A | 12/1998 | Jovicic et al. |
| 5,872,850 A | 2/1999 | Klein et al. |
| 5,911,141 A | 6/1999 | Kelley et al. |
| 5,983,208 A | 11/1999 | Haller et al. |
| 6,005,939 A | 12/1999 | Fortenberry et al. |
| 6,052,710 A | 4/2000 | Saliba et al. |
| 6,073,106 A | 6/2000 | Rozen et al. |
| 6,125,352 A | 9/2000 | Franklin et al. |
| 6,154,768 A | 11/2000 | Chen et al. |
| 6,192,380 B1 | 2/2001 | Light et al. |
| 6,199,079 B1 | 3/2001 | Gupta et al. |
| 6,208,659 B1 | 3/2001 | Govindarajan et al. |
| 6,233,608 B1 | 5/2001 | Laursen et al. |

(Continued)

FOREIGN PATENT DOCUMENTS

WO      WO 01/46783       6/2001

OTHER PUBLICATIONS

Microsoft.NET Passport Technical Overview, Sep. 2001, entire article.

(Continued)

*Primary Examiner*—Seung H Lee
(74) *Attorney, Agent, or Firm*—Sentry Law Group; Steven P. Wigmore

(57) ABSTRACT

A system and method of providing relevant sales context information that would enable vendors to reduce cost of operations, increase productivity of their mobile sales forces, and drive improved efficiencies throughout. Mobile sales force representatives can utilize a handheld computing device for reviewing relevant customer sales information prior to a sales visit; for training and other purposes during a sales visit; and inputting new customer sales information during or after a sales visit, which can then be uploaded to a server over a wireless network for future use. The handheld device can communicate with a server to download the customer information onto the handheld device and to upload from the handheld device current customer information data obtained from a customers sales visit to a server. The server can transmit the current customer information data to multiple sales force representatives who can utilize that information in the sales environment.

20 Claims, 10 Drawing Sheets

U.S. PATENT DOCUMENTS

| | | | |
|---|---|---|---|
| 6,243,688 | B1 | 6/2001 | Kalina |
| 6,247,029 | B1 | 6/2001 | Kelley et al. |
| 6,253,203 | B1 | 6/2001 | O'Flaherty et al. |
| 6,298,347 | B1 | 10/2001 | Wesley |
| 6,321,339 | B1 | 11/2001 | French et al. |
| 6,356,905 | B1 | 3/2002 | Gershman et al. |
| 6,385,596 | B1 | 5/2002 | Wiser et al. |
| 6,401,085 | B1 | 6/2002 | Gershman et al. |
| 6,491,217 | B2 | 12/2002 | Catan |
| 6,571,279 | B1 | 5/2003 | Herz et al. |
| 6,571,285 | B1 | 5/2003 | Groath et al. |
| 6,584,448 | B1 | 6/2003 | Laor |
| 6,665,704 | B1 | 12/2003 | Singh |
| 6,725,050 | B1 | 4/2004 | Cook |
| 6,845,370 | B2 | 1/2005 | Burkey et al. |
| 2001/0011250 | A1 | 8/2001 | Paltenghe et al. |
| 2002/0002684 | A1 | 1/2002 | Fox et al. |
| 2002/0107972 | A1 | 8/2002 | Keane |

OTHER PUBLICATIONS

Microsoft.NET Passport, "What's New", Sep. 2001, entire article.

Alan Cohen and Walaika Haskins, "Grab-and-Go Web", *PC Magazine*, Oct. 19, 2000, pp. 1-3.

Microsoft PressPass, Microsoft.NET: "A Platform for the Next Generation Internet", Jun. 22, 2000, pp. 1-7.

Microsoft Press Release. "Microsoft Passport Offers Streamlined Purchasing Across Leading Web Sites", Oct. 11, 1999, pp. 1-4.

Graeme Bennett, PC Buyer's Guide.com, (updated Jun. 22, 2000), "NGWS—Microsoft's Dot Net Strategy", pp. 1-5.

Webpage entitled: "Microsoft's Passport: Streamlining Commerce and Communication on the Web", available at www.passport.com, Oct. 11, 1999, pp. 1-3.

Webpage entitled: "Online Businesses Use Microsoft Passport Single Sign-In and Wallet Services to Provide Customers with Secure and Convenient Shopping", available at www.microsoft.com, May 17, 2000, pp. 1-2.

Garry Gunnerson, "EZ Login", *PC Magazine*, pp. 1-2, Mar. 14, 2000.

"Ezlogin.Com Introduces Liveclips, Enabling Net Users to Clip Content from Anywhere on the Web and Paste it on a Custom Page", Java Industry Connection, Mar. 8, 2000, pp. 1-2.

Gator Press Release. "Gator.Com Delivers on the Promise of the Electronic Commerce Modeling Language (ECML) Standard Today: Gator offers one-click shopping at over 5,000 e-commerce sites today", Jun. 14, 1999, pp. 1-2.

Gator Press Release. "Internet Start-up Gator.com Introduces Gator, the Web's First Smart Online Companion: New Internet product offers one-click login and express registration and checkout across the web", Jun. 14, 1999, pp. 1-3.

Gator Press Release. "Gator Helps Consumers at More than 25,000 E-Commerce and Registration Sites in First Month of Usage: Software an invaluable companion for more than 80,000 online consumers", Aug. 3, 1999, pp. 1-2.

"Choicepoint Unveils New Web-based Pre-employment Screening Service", BusinessWire p. 1287, May 17, 1999.

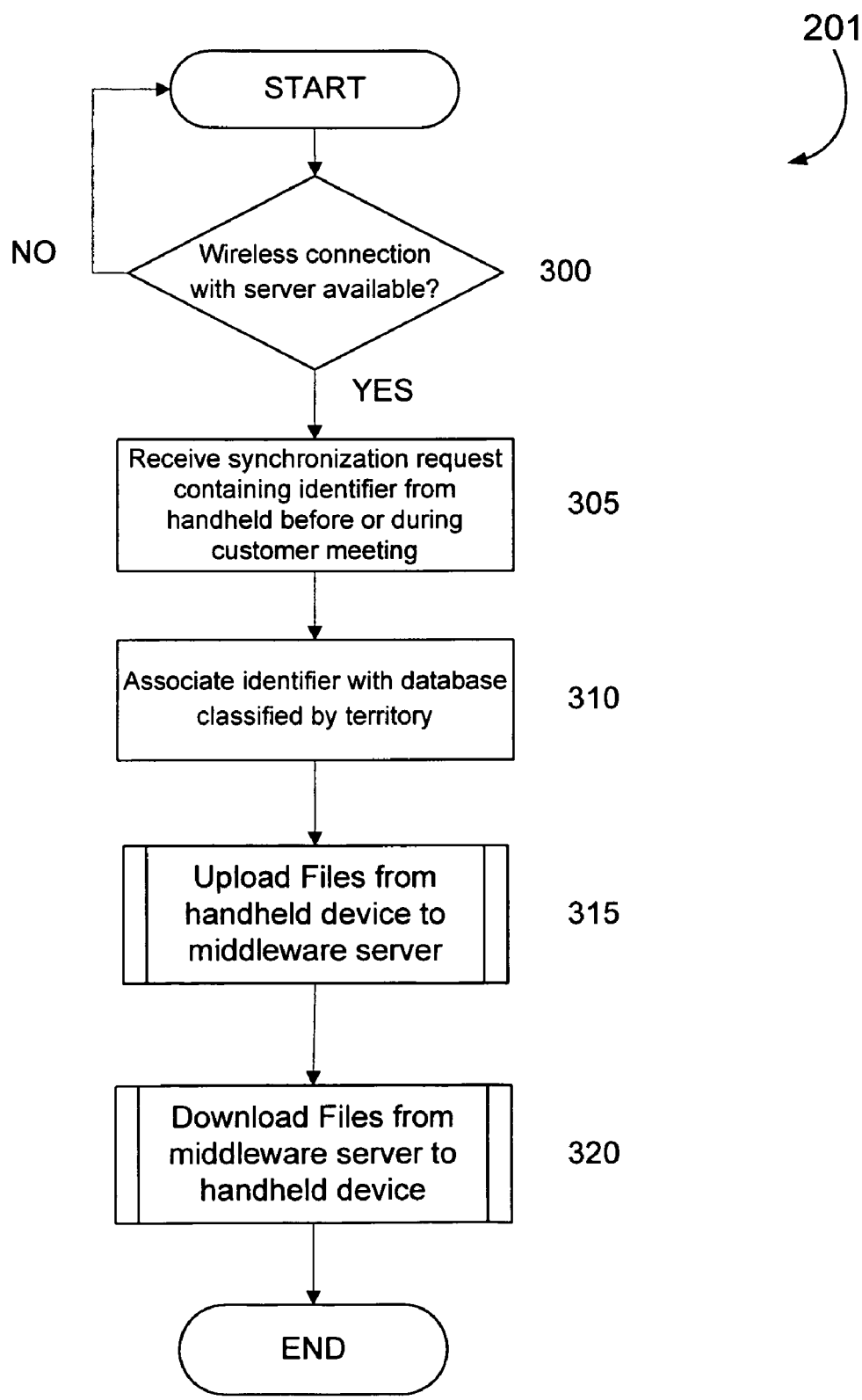

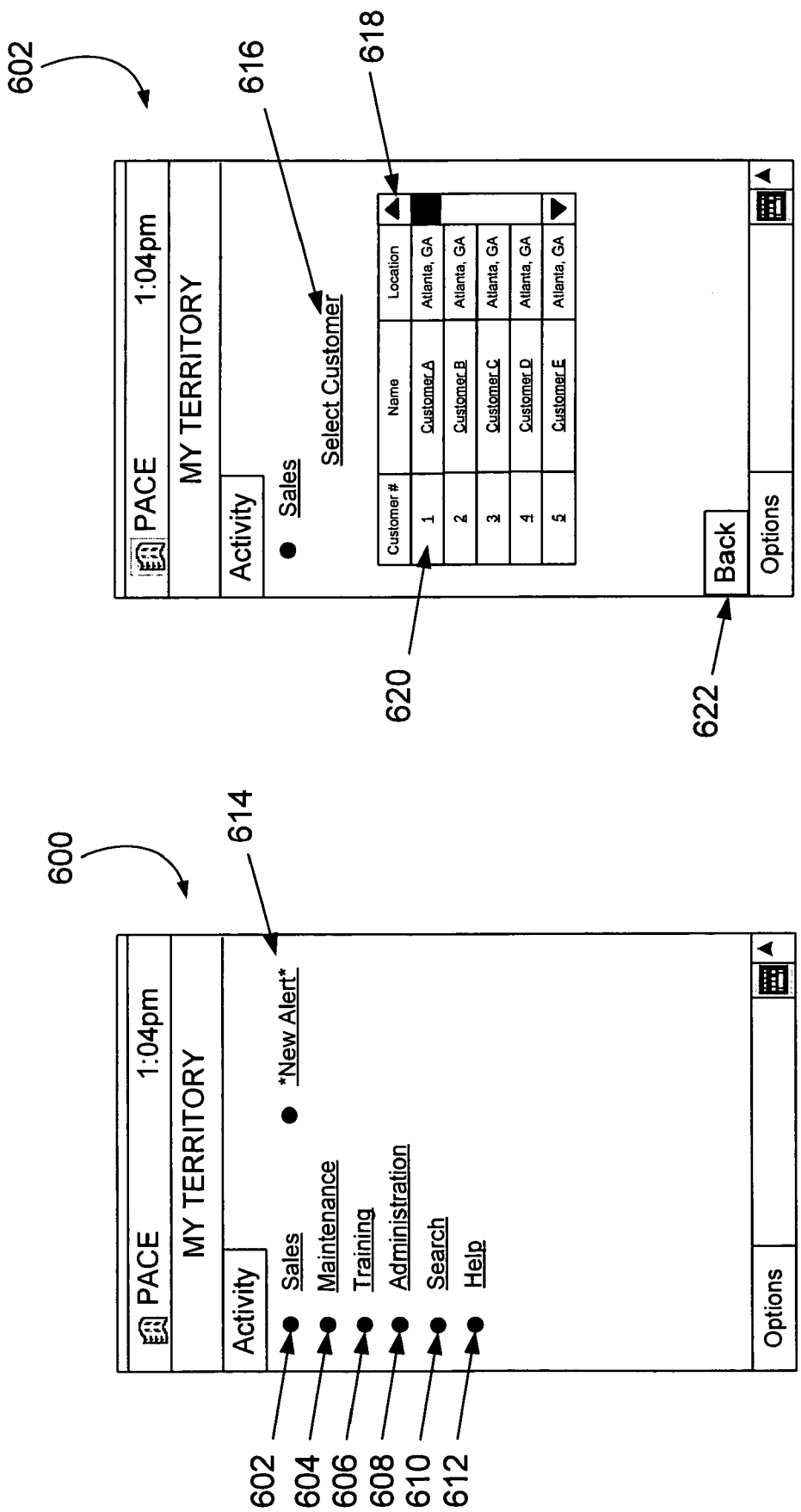

SYSTEM AND METHOD FOR FACILITATING SALES UTILIZING CUSTOMER RELATIONSHIP MANAGEMENT TECHNOLOGY

RELATED PATENT APPLICATIONS

This patent application is related to U.S. patent application Ser. No. 10/421,639, entitled "Systems and Methods for Providing Field Force Automation in Big Box Retail Environments," filed Apr. 22, 2003, U.S. patent application Ser. No. 11/317,646, entitled "System and Method For Communicating Data Between Wireless Mobile Hand-Held Computer and a Back-End Computer System," filed on Dec. 23, 2005; U.S. patent application Ser. No. 11/317,646, entitled "Systems and Methods For Managing Asset Installation and Evaluation," filed concurrently herewith on Dec. 30, 2005; and U.S. patent application Ser. No. 11/323,338, entitled "System and Method for Facilitating the Transfer of Information Relating to Quality of an Organization," filed concurrently herewith on Dec. 30, 2005. The complete disclosure of the above-identified related applications is hereby fully incorporated herein by reference.

FIELD OF THE INVENTION

The invention relates generally to Customer Relationship Management (CRM) technology. More particularly, the invention relates to a system and method for enabling mobile sales force representatives to utilize mobile handheld computing devices that can be synchronized with a secure server for obtaining relevant information in the sales context in a near real-time environment.

BACKGROUND

In the conventional sales environment, companies employ large numbers of salespeople to promote and sell their products in particular territories and regions. These mobile sales force representatives can be responsible for hundreds and possibly thousands of customers. Furthermore, while not only handling existing customers' accounts, mobile sales force representatives are continuously encouraged by their employers to increase sales and add new accounts. The ability for a mobile sales force representative to balance the workload and be an efficient salesperson can be extremely difficult.

To assist their sales force, companies maintain large amounts of information about their products and their customers so they can pass it along to their sales force. In a typical sales context, a mobile sales force representative can access this information by contacting a technician at a call center run by the company. This information consists of details about new products, the particular customer's historical information, and other relevant sales information. This type of system can be inefficient as the vendor has to spend money to employ individuals to monitor the calls and the mobile sales force representatives are spending valuable time on the phone trying to collect what can amount to a large volume of information about a product and/or customer.

Another problem that currently plagues mobile sales force representatives is the managing of customer communications. For large customers that buy and sell huge volumes of products, multiple mobile sales force representatives may be necessary to handle the customer's demands. Therefore, it is not uncommon for certain tasks to be performed multiple times or not at all, as the mobile sales force representatives have difficulty in determining what the other representatives are doing or have done with regard to a particular customer.

In addition, for both sales and customer communications information, there is a delay on how quickly this information is fed back into the company's databases. In a conventional approach, the mobile sales force representatives are required to complete written reports or checklists summarizing client meeting or filling out purchase orders for new sales orders. In turn, this information must be phoned in, mailed, or hand-delivered back to the company in order for them to enter the information into the appropriate databases. Especially for customer comments, this information may not be available until after a subsequent customer contact; therefore, leading to continued inefficiencies in supporting the customer's demands.

Furthermore, mobile sales force representatives have typically been hesitant when it comes to adopting new technological innovations to assist them in their jobs. Many mobile sales force representatives either ignore technology innovations all together and rely on their own skill or they become frustrated when they must adapt to working with multiple devices such as cell phones, laptops, pagers, personal digital assistants (PDA), etc.

Accordingly, there remains a need for a system and method of providing relevant sales context information that would enable vendors to reduce cost of operations, increase productivity of their mobile sales forces, and drive improved efficiencies throughout.

SUMMARY OF THE INVENTION

The invention satisfies the above-described and other needs by providing systems and methods for facilitating the transfer of relevant sales information from a server to a mobile handheld computing device and from a mobile handheld computing device to the server in real-time or near real-time. The handheld devices can be configured with specialized software for assisting the sales representative in reviewing relevant customer information prior to a sales visit; utilizing the device for training and other purposes during the sales visit; and inputting new customer sales information after a sales visit, which can be uploaded to a server for future use by multiple handheld devices.

In preparation for visiting a customer location or to conduct research about a particular customer, a mobile sales force representative can obtain the most current, relevant sales context information by synchronizing the handheld device with a database. In order to synchronize with the database, the handheld device can determine whether there is a wireless connection available with a middleware server. When a wireless connection becomes available, a synchronization request is transmitted from the handheld device to the middleware server. Each handheld device can be assigned a unique identifier, whereby when the middleware server receives a synchronization request from the handheld, the database can then associate that identifier with a particular database classification, such as by a particular territory or group. After receiving the synchronization request, the handheld device can initially upload to the middleware server all files that have not yet been previously transferred and then subsequently, the handheld device can download new files from the middleware server to the handheld device.

To facilitate a rapid upload process, the middleware server can specify that each handheld device maintain an index of files to be uploaded. During a synchronization request, the file index can be transmitted to the middleware server, and the middleware server can parse the index and cross-references each indexed file against its list of files received from the handheld device. Next, the middleware server can instruct the handheld device to upload only those indexed files that have not been previously received and/or not received within a certain timeframe by the middleware server. The handheld device can upload the files to a queue on the middleware server. The middleware server can then process and transfer the queued files to the database for storage through a FTP server. Any files that are received intact from the handheld device can be added to a list maintained by the middleware server to assist in uploading the correct files during a subsequent synchronization request.

To facilitate a rapid download process, files downloaded from the middleware server to the handheld device can be staged in advance of the file synchronization request. When a file synchronization request is received at the middleware server from a handheld device, the middleware server can detect one or more identifiers associated with the handheld device and can transmit any files associated with the identifier(s) to the handheld device. After receiving the files, the handheld device can sort and display the records in predetermined categories based on the software of the handheld device and the preferences set by a sales force representative or the sales force representative's agency. The sales force representative can make selections on the handheld device to view the particular categories in order to review the customer information.

The invention allows mobiles sales force representatives or their agencies to access the most current customer information in real-time or near real-time. Furthermore mobile sales force representative agencies can monitor their mobile sales force representatives' performance as well as provide the mobiles sales force representatives with the most current information about new products that will assist them in the sales environment.

Additional aspects, features, and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

FIG. 6-1 through FIG. 6-8, illustrates exemplary screen displays which provide a demonstration of the functionality of the handheld device in accordance with an exemplary embodiment of the invention.

FIG. 7 is an illustration of a bar chart 700 indicating relative sales force representative performance relating to product sales promotion to customers, generated in accordance with an exemplary embodiment of the invention.

DETAILED DESCRIPTION OF EXEMPLARY EMBODIMENTS

The invention provides systems and methods for enabling mobile sales force representatives to utilize a handheld computing device for reviewing relevant customer sales information prior to a sales visit; for training and other purposes during a sales visit; and inputting new customer sales information during or after a sales visit, which can then be uploaded to a server over a wireless network for future use. The handheld device may communicate with a secure server via a network in order to upload data and to receive messages, data, software updates, etc. Data uploaded to the secure server may be stored in a database. Mobile sales force representatives or sales force representative agencies may be provided with permission-based access to the database in order to perform data analysis.

Sales force representative agencies may be responsible for monitoring the progress of the mobile sales force representatives. Ultimately, the systems and methods of the invention allow mobile sales force representatives, utilizing mobile handheld devices, with real-time (or near-real-time) access to information regarding the sale and presentation of product lines. Furthermore, the invention can provide mobile sales force representative agencies with information regarding the performance of the mobile sales force representatives. Exemplary embodiments of the invention will hereinafter be described with reference to the drawings, in which like numerals are used to indicate like elements.

Figure 1:
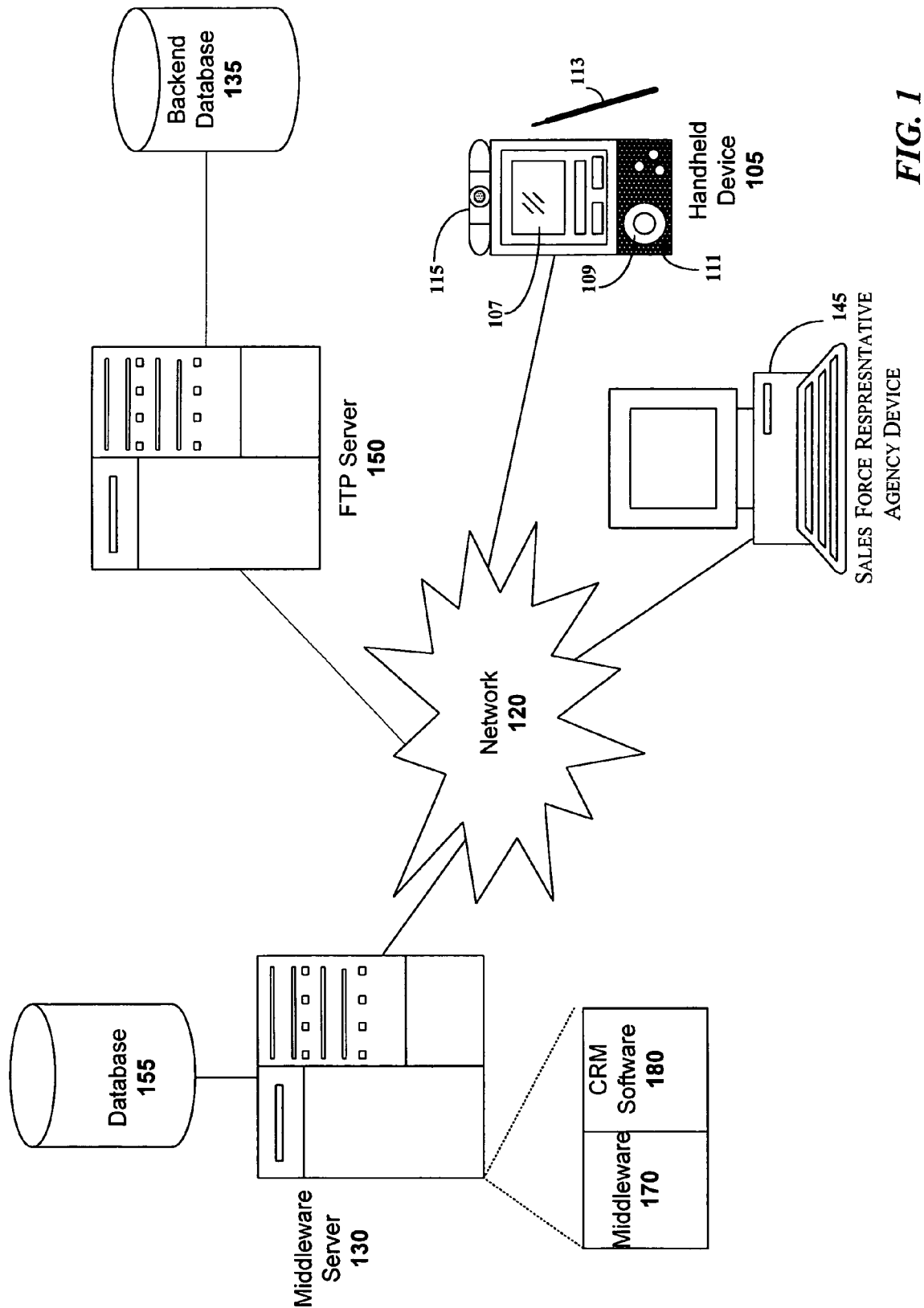
FIG. 1 is a block diagram illustrating an exemplary operating environment for implementation of various exemplary embodiments of the invention.

FIG. 1 is a block diagram illustrating an exemplary operating environment for implementation of various exemplary embodiments of the invention. Network devices are interconnected via a network 120. The network 120 can comprise a wired or wireless telecommunication means by which network devices can exchange data, including for example, a local area network ("LAN"), a wide area network ("WAN"), an intranet, an Internet, or any combination thereof. Throughout the discussion of exemplary embodiments of the invention, it should be understood that the terms "data" and "information" are used interchangeably herein to refer to text, images, audio, video, signatures, and/or any other form of information that can exist in a computer-based environment.

A network device can be any device capable of transmitting and receiving data over the network 120. For example, a network device can be a middleware server 130, a file transfer protocol ("FTP") server 150, a sales force representative agency device 145, a handheld device 105, and/or dedicated storage devices, such as a database 135 or 155. The middleware server 130 can comprise software for interacting, e.g., via the network 120 and/or a direct data link (not shown), with the FTP server 150 to obtain data from the backend database 135. The invention could include any number of backend databases 135 as represented in FIG. 1.

As one example, a sales force representative agency device 145 can interact with the middleware server 130 via the network 120 using web browser application software. Each sales force representative agency device 145 can comprise a desktop computer, a laptop computer, a handheld device 105, or any other wired or wireless, processor-driven device. By way of illustration only, the handheld device 105 can be a Microsoft Windows® CE-based device, such as the Casio 'Cassiopeia,' the Dell™ 'Axim™,' etc., a Palm OS-based personal digital assistant (PDA), or any other suitable handheld computing device. The handheld device 105 can comprise input/output ("I/O") devices, such as a display screen 107, integrated controls (buttons) 109, a camera 115, a scanner (not shown), a microphone 111, a speaker (not shown), and a printer 112. The handheld device 105 can be configured with any combination of integrated I/O devices or add-on I/O devices. Add-on I/O devices can be coupled to the handheld device 105, e.g., by way of an expansion slot, port, wireless link, or other suitable interface. The display screen 107 can be touch-sensitive or motion-sensitive to accept input signals from a pointing device 113, such as a stylus or finger.

The handheld device 105 can further comprise communication capabilities in any well-known or emerging form, including, e.g., a modem, a network interface, or the like. Through such capabilities, the handheld device 105 can communicate with the network 120 via a wireless connection and/or via a wired connection. By communicating via a wireless connection, for example, the handheld device 105 can transmit data to, and receive data from, the middleware server 130 in real-time or near real-time. Thus, the sales force representative agencies, can track product sales and customer information and monitor sales force representatives' performance in real-time or near real-time. By way of example, see co-pending U.S. patent application Ser. No. 11/323,562, entitled "Systems and Methods For Managing Asset Installation and Evaluation," filed concurrently herewith on Dec. 30, 2005, which is hereby fully incorporated herein by reference.

In addition, the sales force representatives can continually receive updated customer and vendor information that can assist them in performing their work assignments. In one embodiment of the invention, the handheld device 105 can communicate with the network 120 via another network device, for example, if connected to the other network device by way of a cradle, cable, or other device or wireless connection. The handheld device 105 can be configured to communicate according to any suitable communication protocol(s).

As shown in FIG. 1, handheld devices 105, a middleware server 130, a FTP server 150 and sales force representative agency devices 145 may all be interconnected by way of a network 120. Sales force representative agency devices 145 may include any processor-driven devices that are configured to communicate with the middleware server 130 via the network 120 or a dedicated communications link.

In the environment shown in FIG. 1, data collected at a handheld device 105 by a sales force representative may be transmitted to the middleware server 130 and may be made instantly (or nearly instantly) available to the other devices connected to the network 120. The middleware server 130 may include or be in communication with a database 135 through a FTP server 150 for storing the data received by the handheld device 105 and/or it may be in communication with database 155. The databases 135, 155 may be configured to store the data in an encrypted format, using a relational data storage model, an object oriented data storage model, a data aggregate storage model (e.g., one or more XML aggregates) or any other suitable data storage model. As one example, sales force representative agency devices 145 may interact with the middleware server 130 via the network 120 using web browser software. By way of example, see discussed in co-pending U.S. patent application Ser. No. 10/421,639, entitled "Systems and Methods for Providing Field Force Automation in Big Box Retail Environments," filed Apr. 22, 2003, and U.S. patent application Ser. No. 11/317,646, entitled "System and Method For Communicating Data Between Wireless Mobile Hand-Held Computer and a Back-End Computer System," filed on Dec. 23, 2005, each of which is hereby fully incorporated herein by reference.

As mentioned, a sales force representative may use the handheld device 105 to collect data during a visit to a retail center or other location. The sales force representative may discuss new products and existing orders and record comments or new orders using the handheld device 105. The handheld device 105 of the invention may be configured with hardware and/or software for receiving and storing various types of data, including text, signatures, images and sounds. By way of illustration only, the handheld device 105 may comprise a Microsoft Windows CE-based device, such as the Casio 'Cassiopeia,' the Dell 'Axim,' etc., a Palm OS-based personal digital assistant (PDA), or any other suitable handheld computing device.

Figure 2:
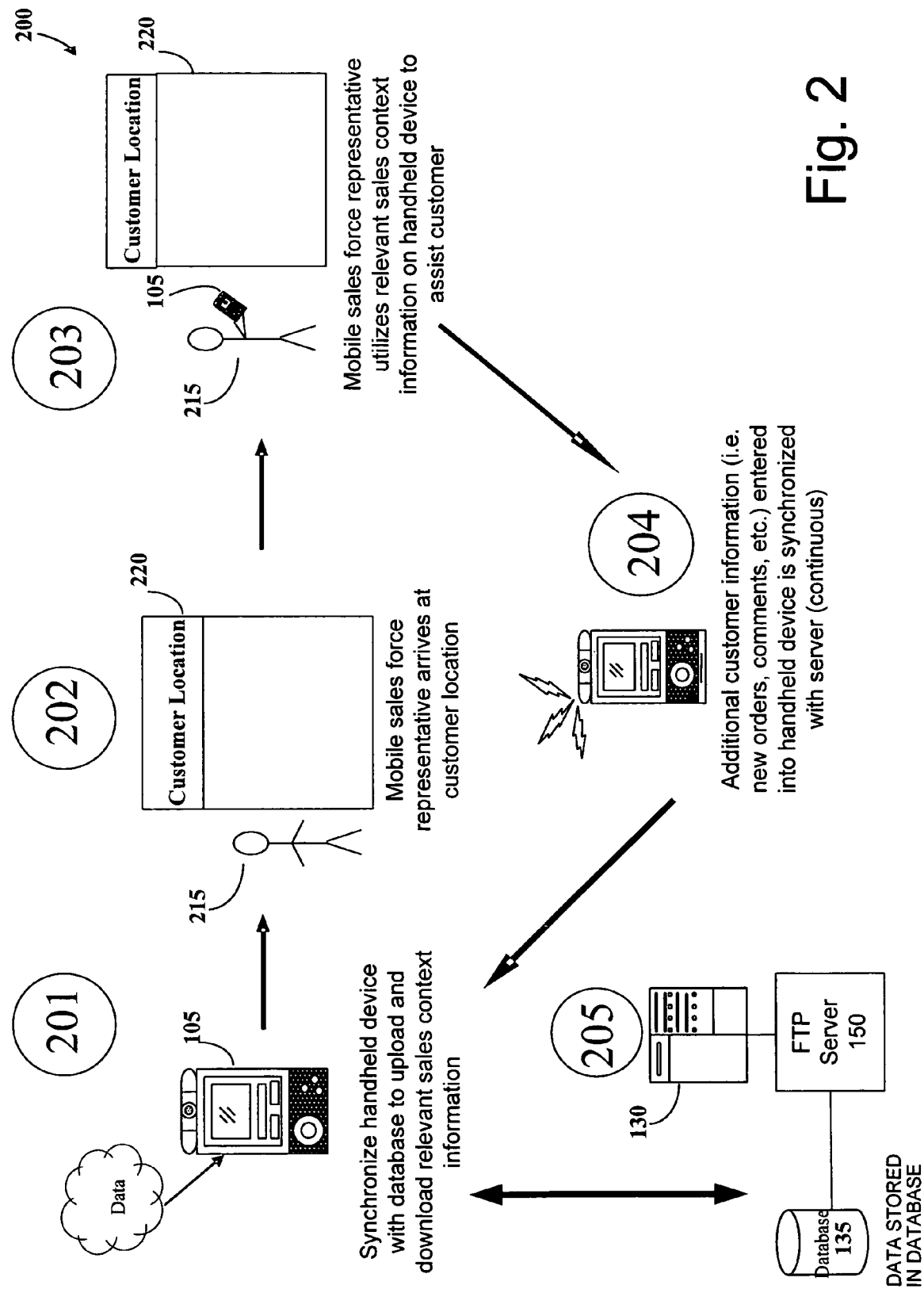
FIG. 2 is a flow diagram illustrating steps in a method for facilitating sales utilizing customer relationship management technology, according to an exemplary embodiment of the invention.

FIG. 2 is a flow diagram illustrating steps in a method 200 for facilitating sales utilizing customer relationship management technology, according to an exemplary embodiment of the invention. The exemplary method 200 of FIG. 2 and all methods described herein, are merely illustrative and, in alternative embodiments of the invention, certain steps can be performed in a different order, in parallel with one another, certain steps can be omitted entirely, and/or certain additional steps can be performed.

In routine 201, a handheld device 105 is synchronized to a middleware server 130 to upload and download relevant sales context information from a backend database 135. Either the middleware server 130 or the handheld device 105 can initiate the synchronization. In synchronizing the handheld device 105 with the middleware server 130, the handheld device 105 transmits current data collected by the sales force representative 215 on the handheld device 105 to the middleware server 130. Furthermore, current data stored at the database 135 is transferred to the handheld device 105 through the middleware server 130. Synchronization of the handheld device 105 can also involve transmitting data, e.g., instructions, software, messages, and/or alerts, from the middleware server 130 to the handheld device 105. Routine 201 is described in greater detail below, in conjunction with FIG. 3.

Another synchronization protocol suitable for the invention is the Red Rover middleware client 137, which is discussed in co-pending U.S. patent application Ser. No. 10/421,639, entitled "Systems and Methods for Providing Field Force Automation in Big Box Retail Environments," filed Apr. 22, 2003, and U.S. patent application Ser. No. 11/317,646, entitled "System and Method For Communicating Data Between Wireless Mobile Hand-Held Computer and a Back-End Computer System," filed on Dec. 23, 2005, each of which is hereby fully incorporated herein by reference.

While routine 201 is identified as a separate step in the process, it is apparent to one of ordinary skill in the art that in a wireless environment, routine 201 can be performed in parallel with any other step in the process. That is, when the handheld device 105 has a good wireless connection to the middleware server 130, data from the handheld device 105 can be transmitted to the middleware server 130 and data from the database 135 can be transmitted to the handheld device 105 through the middleware server 130. It is the wireless aspect of the handheld device 105 that can allow for the real time or nearly real time tracking of customer information by the middleware server 130.

In conjunction with routine 201, data uploaded from the handheld device 105 to the middleware server 130 is stored in the database 135 connected through an FTP server 150 in step 205. The middleware server 130 makes the stored data available for the handheld devices 105. As discussed, the middleware server 130 may also store the transmitted data in the database 155 at or connected to the middleware server 130.

Furthermore, in step 205, the stored data can be transmitted to other handheld devices from the database 135 through the middleware server 130.

After receiving the most current user information in routine 201, a mobile sales force representative 215 arrives at customer location 220 to conduct a sales visit with a customer in step 202. In step 203, the sales force representative 215 can utilize relevant sales context information displayed on the handheld device 105 to facilitate the sale of products to the customer. In so doing, the sales force representative 215 collects data, such as new order information and comments, related to the customer on his handheld device 105.

In step 204, the new customer information obtained in step 203 is entered into the handheld device 105 by the mobile sales force representative 215. The entered data can comprise new order information, customer contact information, and other comments concerning the customer that the mobiles sales force representative 215 may find necessary to input into the handheld device 105.

Figures 3, 4, 6:
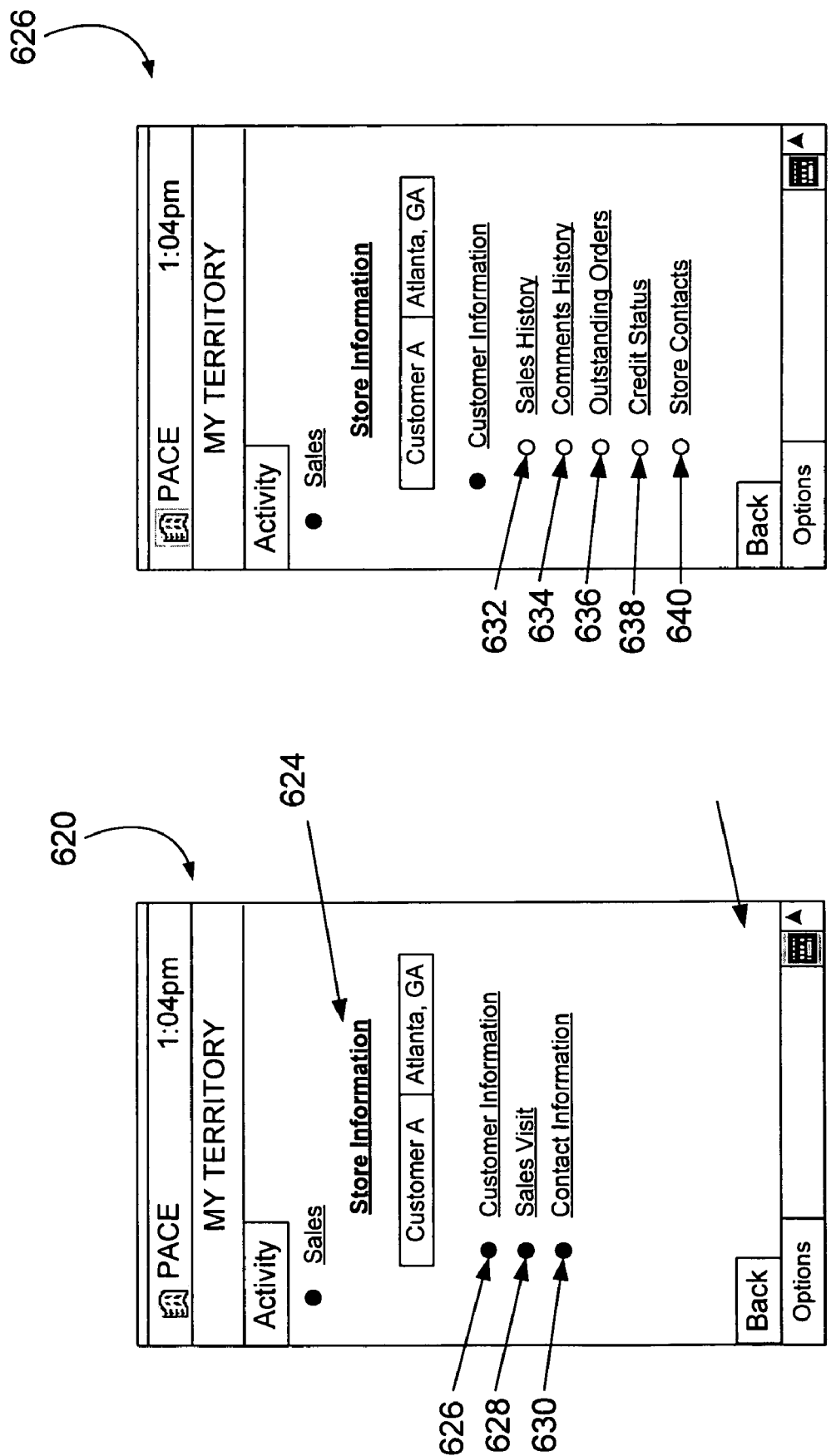
FIG. 3 is a block flow diagram illustrating steps for synchronizing the handheld device with the database, according to an exemplary embodiment of the invention.
FIG. 6, comprising
Figure 6:
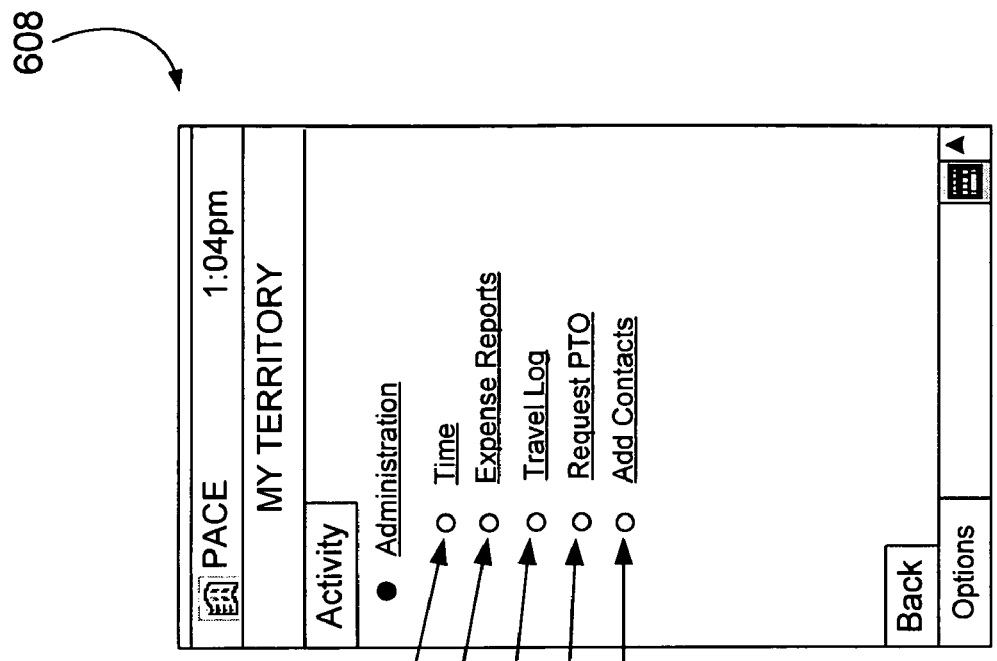
Figures 5, 6:
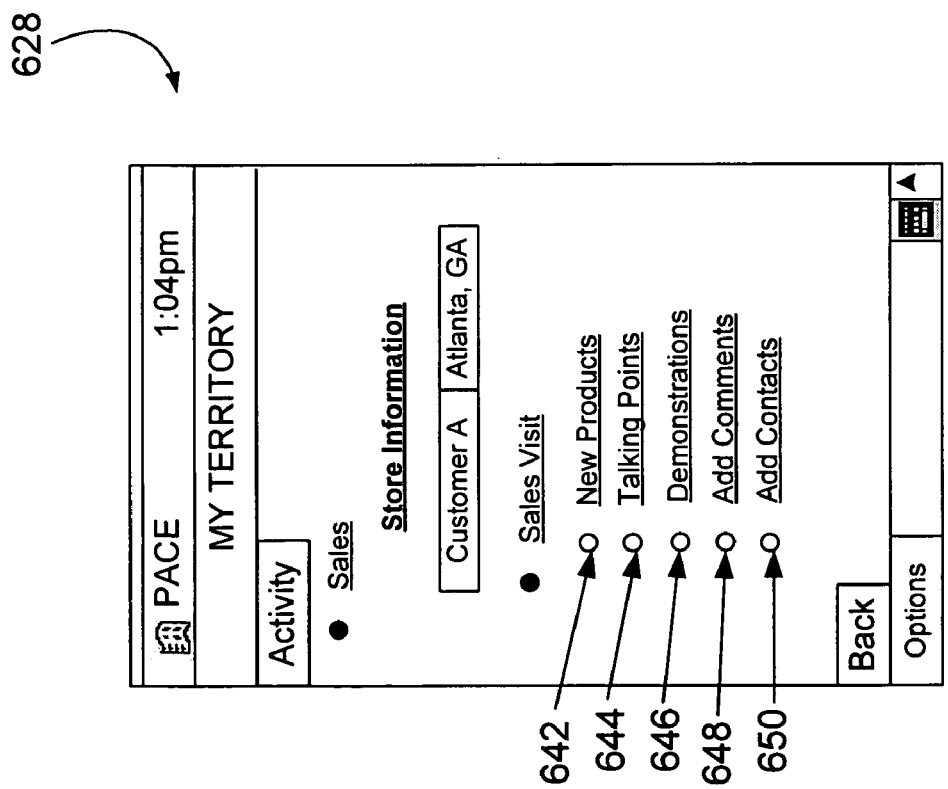

FIG. 3 is a block flow diagram illustrating steps in a routine 201 for synchronizing current customer information between the handheld device 105 and the database 135 utilizing the middleware server 130, according to an exemplary embodiment of the invention. The exemplary routine 201 is merely illustrative and, in alternative embodiments of the invention, certain steps can be performed in a different order, in parallel with one another, certain steps can be omitted entirely, and/or certain additional steps can be performed. Furthermore, specific examples of the types of information synchronized in exemplary routine 201 will be described in FIGS. 6-1 to 6-8 below.

As previously discussed, the invention contemplates a proprietary file synchronization middleware client 170 known as Red Rover located on the middleware server 130. The middleware client 170 is responsible for the communications between the middleware server 130, FTP server 150, database 135, and handheld device 105 in exemplary routine 201.

In an exemplary embodiment, the exemplary routine 201 utilizes a FTP server 150 located between the middleware server 130 and a backend database 135. The FTP server 150 is responsible for accessing files on the backend database 135 and holding them until they are requested by the middleware server 130. Therefore, when files are updated at the backend database 135, the backend database 135 can "drop off" the files at the FTP server in order to be "picked up" by the middleware server 130. In order to receive and send files from the FTP server 150, the middleware client 170 communicates through and utilizes a file transfer protocol "FTP," which is well known to one of ordinary skill in the art, to perform the exemplary routine 201.

By way of example, the backend database 135 can be a proprietary database operated by a sales force representative agency. In a sales context related environment, the sales force representative agency may want to include information about a new product onto the backend database 135 in order for the sales force representatives 215 to subsequently inform the customers about the new product. Therefore, when the new product information is updated on the backend database 135, the files will be automatically transmitted to the FTP server 150. At periodic times, the middleware server 130 will communicate with the FTP server 150 using FTP to upload new files to the FTP server 150. Furthermore, the middleware server 130 will also access and download the new files on the FTP server 150. Subsequently, these files can be transferred to particular handheld devices 105.

In an exemplary embodiment, the middleware server 130 can comprise a client specific software application such as PACE software, that is owned by the assignee of the invention, and described in co-pending U.S. patent application Ser. No. 10/421,639, entitled "Systems and Methods for Providing Field Force Automation in Big Box Retail Environments," filed Apr. 22, 2003, the entire contents of which is hereby fully incorporated herein by reference, to perform the exemplary routine 201. The PACE software is a customer relationship management software application 180 that may reside on the middleware server. The PACE software provides for the pre-processing of information received from the backend database 135 on the middleware server 130 that is destined for the handheld device 105.

The handheld device 105 or the middleware server 130 can initiate a synchronization request to synchronize the most current customer information between the database 135 and the handheld device 105. However, a wireless connection between the handheld device 105 and the middleware server 130 must be available in order to synchronize the data. Therefore, in decision step 300, the handheld device 105 determines whether a wireless connection with the middleware server 130 is available. If no wireless connection is available the handheld device 105 continues to receive current data on the customer as inputted by the mobile sales force representative in step 204. However, if a wireless connection with the middleware server 130 is available in step 300, synchronization of the most current customer information between the database 135 and the handheld device 105 can occur.

After it is determined that a wireless connection is available in step 300, the middleware server 130 receives a synchronization request containing a particular identifier from the handheld device 105 in step 305. In step 310, the middleware server 130 associates the identifier with the database 135. The identifier can associate the mobile sales force representative into different groups or classifications in the database. For example, the mobile sales force representative may be associated with different divisions or territories based on where the representative is assigned and/or the type of customers the representative is responsible for. These classifications make it more efficient to determine the updated information that the mobile sales force representatives receive on their handheld devices.

In routine 315, the files are uploaded from the handheld device 105 to the middleware server 130. Upon successful storage of the upload file, the middleware server 130 acknowledges successful upload to the handheld device client 105. Upon acknowledgement, the handheld device 105 archives and/or deletes the source upload file and continues to transmit each remaining upload file following the same process. Routine 315 will be discussed in more detail below in reference to FIG. 4. After processing all upload files, the handheld device 105 downloads files from the middleware server 130 in routine 320. Routine 320 will be discussed in more detail below in reference to FIG. 5. Upon completion of the upload and download protocols, the handheld device 105 then disconnects from the middleware server 130 without awaiting an acknowledgement that the files were received intact and successfully stored in the appropriate database.

Figure 4:
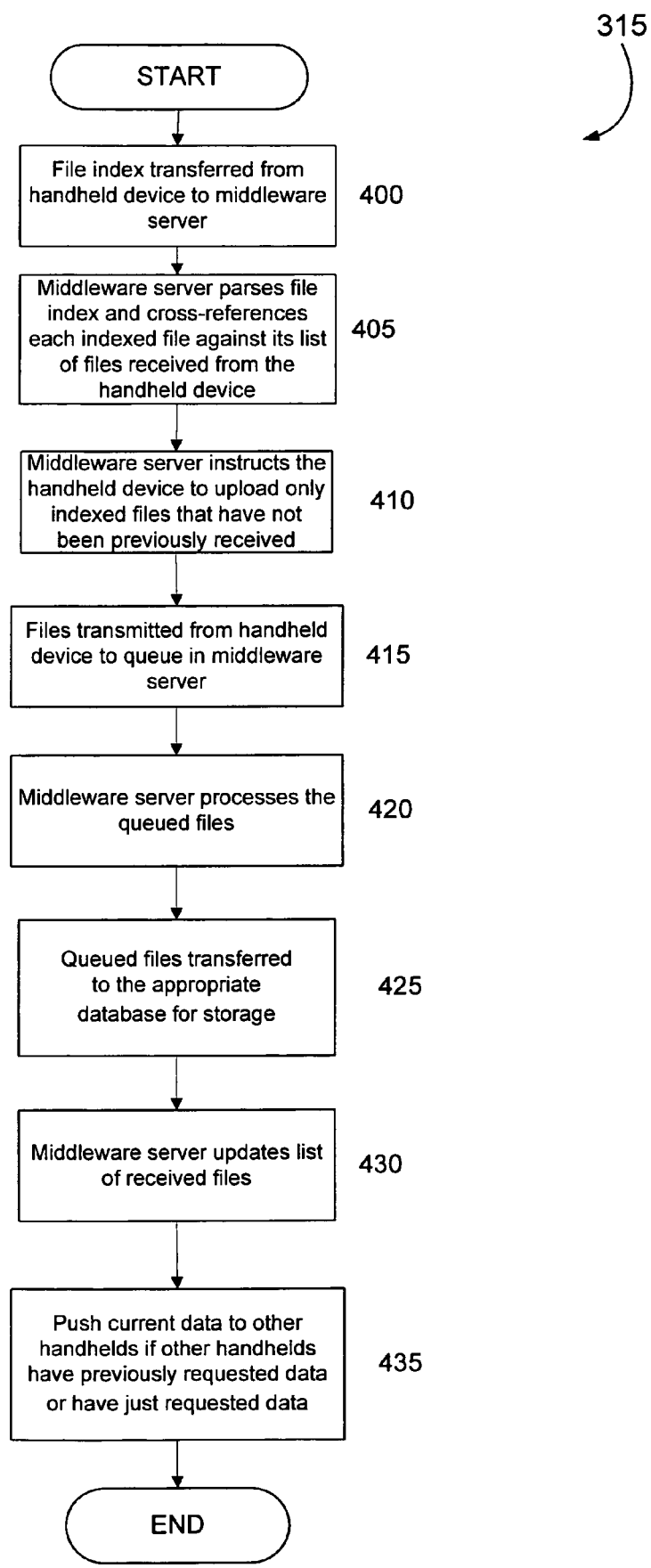
FIG. 4 is a block flow diagram illustrating steps for uploading relevant sales context information from the handheld device to the database, according to an exemplary embodiment of the invention.

FIG. 4 is a block flow diagram illustrating steps in a routine 315 for synchronizing the handheld device 105 with the middleware server 135 to upload relevant sales context information, according to an exemplary embodiment of the invention. The exemplary routine 315 is merely illustrative and, in alternative embodiments of the invention, certain steps can be performed in a different order, in parallel with one another, certain steps can be omitted entirely, and/or certain additional steps can be performed.

According to the middleware client 170, uploads from a handheld device 105 to the middleware server 130 are meant to be "fast and dumb." To facilitate a rapid upload process, the middleware client 170 specifies that each handheld device 105 maintain an index of files to be uploaded to the middleware server 130. In step 400, the index is transmitted to the middleware server 130 during the initial synchronization request of step 305. In step 405, The middleware server 130 parses the index received from the handheld device 105 and cross-references each indexed file against its list of files received from the handheld device 105. In step 410, the middleware server 130 then instructs the handheld device 105 to upload only those indexed files that have not been previously received and/or not received within a certain timeframe by the middleware server 130.

In step 415, the handheld device 105 uploads its files to a queue on the middleware server 130. In step 420, the middleware server 130 processes the queued files. Part of the processing in step 420 involves formatting the queued files into an understandable format. A part of the formatting the data at the middleware server 130 involves altering the information whereby the middleware client 170 can communicate using FTP through the FTP server 150 to transfer the information to the database 135. FTP is used as one form of file transport for the transferring of the files between the middleware server 130 and database 135. In step 425, the queued files are transferred to the database 135 for storage.

In step 430, any files received intact from the handheld device 105 are added to the list maintained by the middleware server 130. The list may be specific to the handheld device 105 (e.g., identified by a handheld identification number) and may record the date and time of reception for each file.

Finally, in step 435, the database 135 can communicate through the middleware server 130 again to utilize the middleware client 170 to transmit the current customer information to handheld devices that have previously requested the data or to handheld devices that have just requested the data. The transmission of the current customer information allows the handheld devices connected to the network to near real-time access to the information.

Figure 5:
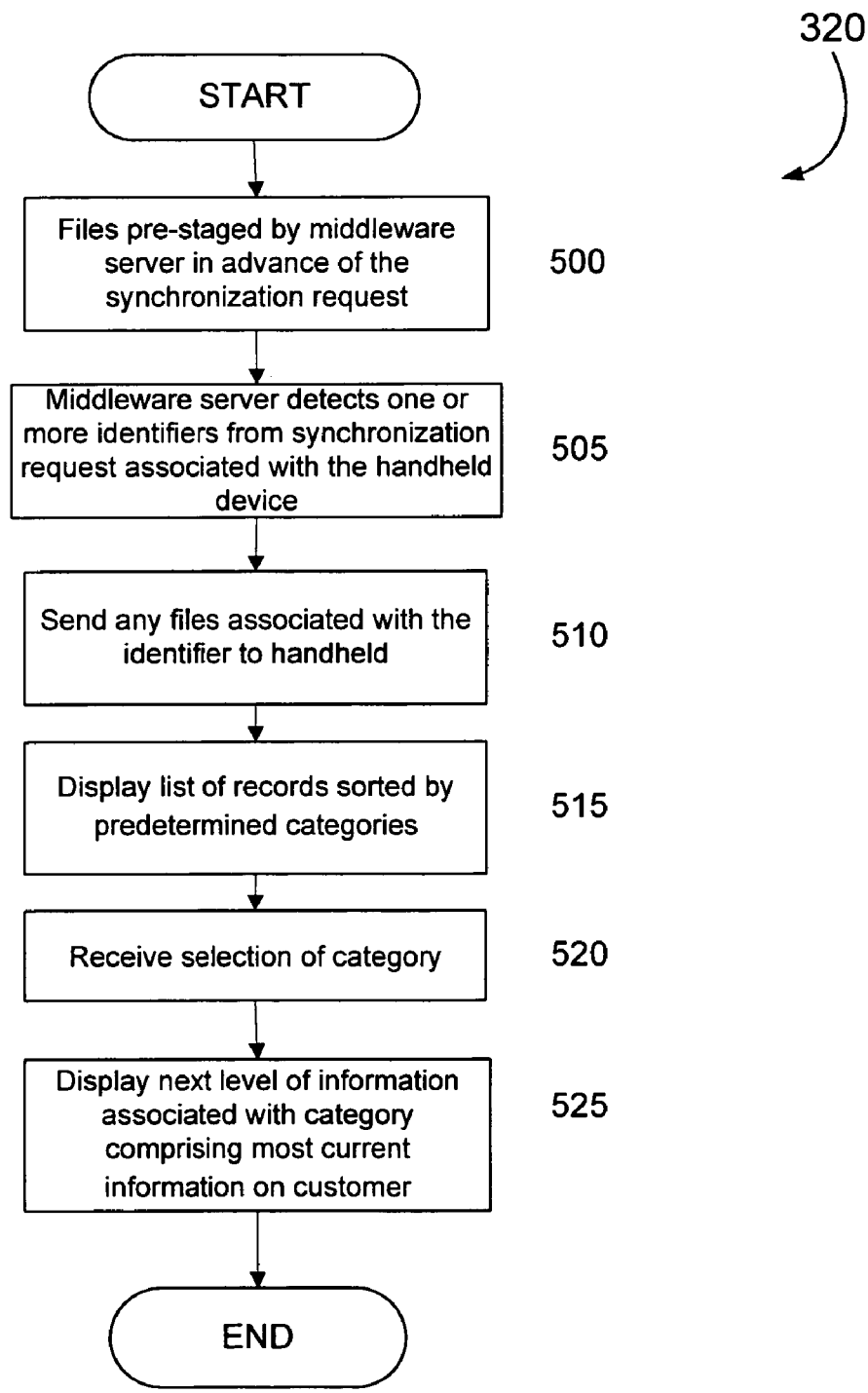
FIG. 5 is a block flow diagram illustrating steps for downloading relevant sales context information from the database to the handheld device, according to an exemplary embodiment of the invention.

FIG. 5 is a block flow diagram illustrating steps in a routine 320 for synchronizing the handheld device 105 with the middleware server 135 to download relevant sales context information, according to an exemplary embodiment of the invention. The exemplary routine 320 is merely illustrative and, in alternative embodiments of the invention, certain steps can be performed in a different order, in parallel with one another, certain steps can be omitted entirely, and/or certain additional steps can be performed.

According to the middleware client 170, files downloaded from the middleware server 130 to the handheld device 105 are staged in advance of the file synchronization request in step 305. Therefore, in step 500, the middleware server will have previously determined which files need to be downloaded to the handheld device 105 in advance of the receipt of a synchronization request. Files may be associated with particular handheld devices 105, particular groups of sales force representatives or their agency, particular customer locations 220, etc., by assigning unique identifiers to any such entities.

When a file synchronization request is received at the middleware server 130 from a handheld device 105 in step 305, the middleware server 130 may detect one or more identifiers associated with the handheld device 105 in step 505. In step 510, the middleware server 130 transmits any files associated with the identifier(s) to the handheld device 105. A hierarchy of priorities for each type of identifier (e.g., handheld device ID, group ID, etc.) may be established so that file downloads may be managed at the device level and/or at the group level. A determination as to whether to download a file to a handheld device 105 may be based on the "last change" date of the file and/or the date the file was last sent to the handheld device 105. Of course, such dates may be ignored in an appropriate case and all files associated with the identifier(s) of the handheld device 105 may be downloaded.

After receiving the files in step 510, the handheld device 105 sorts and displays the customer information records in predetermined categories in step 515 based on the software of the handheld device 105 and the preferences set by the sales force representative 215 or the sales force representative's agency. In step 520, the sales force representative 215 can make selections on the handheld device 105 to view the particular categories in order to review the customer information. After the sales force representative makes a selection, the handheld device 105 can display the next level of information associated with the particular category comprising the most current information on the customer in step 525. For examples of the categories of information available to the mobiles sales force representative 215 on the handheld device, see discussion below related to FIGS. 6-1 to 6-8.

FIG. 6, comprising FIG. 6-1 through FIG. 6-8, illustrates exemplary screen displays which provide a demonstration of the functionality of the handheld device 105 in accordance with an exemplary embodiment of the invention. Each of FIGS. 6-1 thru 6-8 are merely illustrative of a display screen 107 of a handheld device 105.

FIG. 6-1 represents an exemplary main menu screen 600 of the handheld device 105. FIG. 6-1 assumes that the sales force representative has bypassed a login interface to gain access to the handheld device 105. To gain access to the handheld device 105, the sales force representative may select his/her name from a pre-populated "Name" list or may otherwise enter his/her name using a stylus 113, integrated controls 109, a microphone 111 or any other integrated or attachable input device. An exemplary login interface may also require that a password be entered into a "Password" field before access to the application is granted. The exemplary main menu 600 represented in FIG. 6-1 presents the mobile sales force representative with different activities that he/she may wish to perform. These activities comprise: "Sales" 602, "Maintenance" 604, "Training" 606, "Search" 608, "Help" 612, and "*New Alert*" 614.

FIG. 6-2 represents an exemplary screen that may be presented to the user upon the selection of the "Sales" link 602. After clicking on the "Sales" link 602, the mobile sales force representative is given the opportunity to select a particular customer 616 in order to obtain information for that customer. The exemplary screen displays a listing of all potential customers 618 that the mobile sales force representative may wish to retrieve information about. As previously discussed, the information can be classified in particular categories and then associated with a mobile sales force representative. The mobile sales force representative can select a customer from the listing 618 in order to review more detailed information about that particular customer. For example, a mobile sales force representative could select the "1" under the "Customer #" or "Customer A" under "Name" to review information about Customer A located in Atlanta, Ga. 620. As will be represented with respect to the subsequent screen shots, navigation buttons such as "Back" 622 will be available to assist the mobile sales force representative in locating the information they need.

FIG. 6-3 represents an exemplary screen that may be presented to the user upon the selection of the "Customer A" link 620. After clicking on the "Customer A" link 620, the mobile sales force representative is presented with the Store Information 624 for Customer A located in Atlanta, Ga. This exemplary screen can display potential options to obtain further information about the customer. These options comprise: "Customer Information" 626, "Sales Visit" 628, and "Contact Information" 630.

FIG. 6-4 represents an exemplary screen that may be presented to the user upon the selection of the "Customer Information" link 626. After clicking on the "Customer Information" link 626, the mobile sales force representative is presented with additional store information for Customer A located in Atlanta, Ga. This exemplary screen can display potential options to obtain further information about the customer. These options comprise: "Sales History" 632, "Comments History" 634, "Outstanding Orders" 636, "Credit Status" 638 and "Store Contacts" 640.

The "Sales History" link 632 may comprise information concerning prior sales history, including quantities and prices. The "Comments History" link 634 may comprise additional notes a previous mobile sales force representative may have made concerning a previous site visit or other matter. The "Outstanding Orders" link 636 may comprise information concerning any orders the customer has not yet received, which may include status information regarding availability or shipping. The "Credit Status" link 638 may comprise information about the customer's credit report, including their credit limit; balance, or issues with previously unpaid bills. Finally, the "Store Contacts" link 640 may comprise information about particular individuals at the customer location that the mobile sales force representative corresponds with, including the contacts' name, phone number, and email.

FIG. 6-5 represents an exemplary screen that may be presented to the user upon the selection of the "Sales Visit" link 628. After clicking on the "Sales Visit" link 628, the mobile sales force representative is presented with additional options related to activities the mobile sales force representative may want to utilize while conducting a site visit for Customer A located in Atlanta, Ga. These potential options comprise: "New Products" 642, "Talking Points" 644, "Demonstrations" 646, "Add Comments" 648 and "Add Contacts" 650.

The "New Products" link 642 may comprise information concerning new products that Customer A may potentially be interested in buying. The "Talking Points" link 644 may comprise certain information that has been prepared for the mobile sales force representatives to present to customers. The "Demonstrations" link 646 may comprise information such as picture, video, or audio files that can be used to enhance the sales experience to the customer by showing them images of certain products that they may be interested in purchasing. The "Add Comments" link 648 may comprise a feature to allow the mobile sales force representative to input any information that he/she may feel is necessary to record so it will be available in a subsequent sales visit and possibly for a different sales force representative. Finally, the "Add Contacts" link 650 may comprise a feature to allow the mobile sales force representative to input any new information about particular individuals at the customer location that the mobile sales force representative corresponds with, including the contacts' name, phone number, and email.

FIG. 6-6 represents an exemplary screen that may be presented to the user upon the selection of the "Administration" link 608. After clicking on the "Administration" link 608, the mobile sales force representative is presented with options related to job administration duties. These potential options comprise: "Time" 652, "Expense Reports" 654, "Travel Log" 656, "Request PTO" 658 and "Add Contacts" 660.

The "Time" link 652 may comprise a feature to allow the mobile sales force representative to input in his/her daily time. The "Expense Reports" link 654 may comprise a feature to allow the mobile sales force representative to input in any expenses such as gas, food, lodging, transportation expenses, etc. The "Travel Log" link 656 may comprise a feature to allow the mobile sales force representative to keep track of his sales route. The "Request PTO" link 658 may comprise a feature to allow the mobile sales force representative to request days off for sickness or vacation. Finally, the "Add Contacts" link 660 may comprise a feature to allow the mobile sales force representative to input any new information about particular individuals at not affiliated with a customer location, including the contacts' name, phone number, and email.

Figures 6, 7, 8:
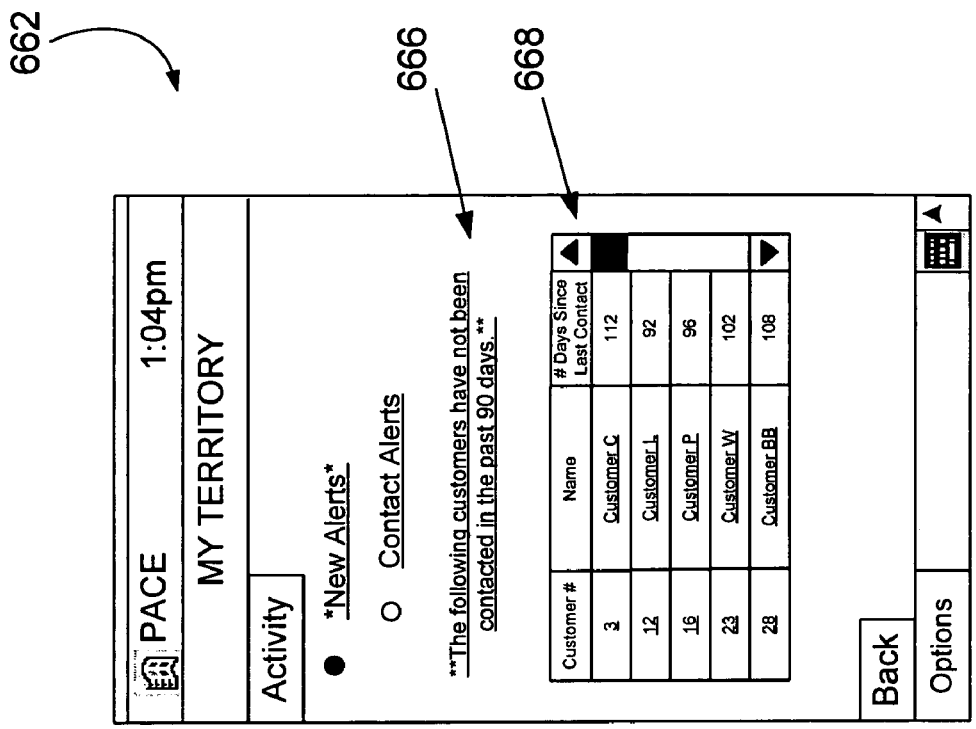
Figures 6, 7:
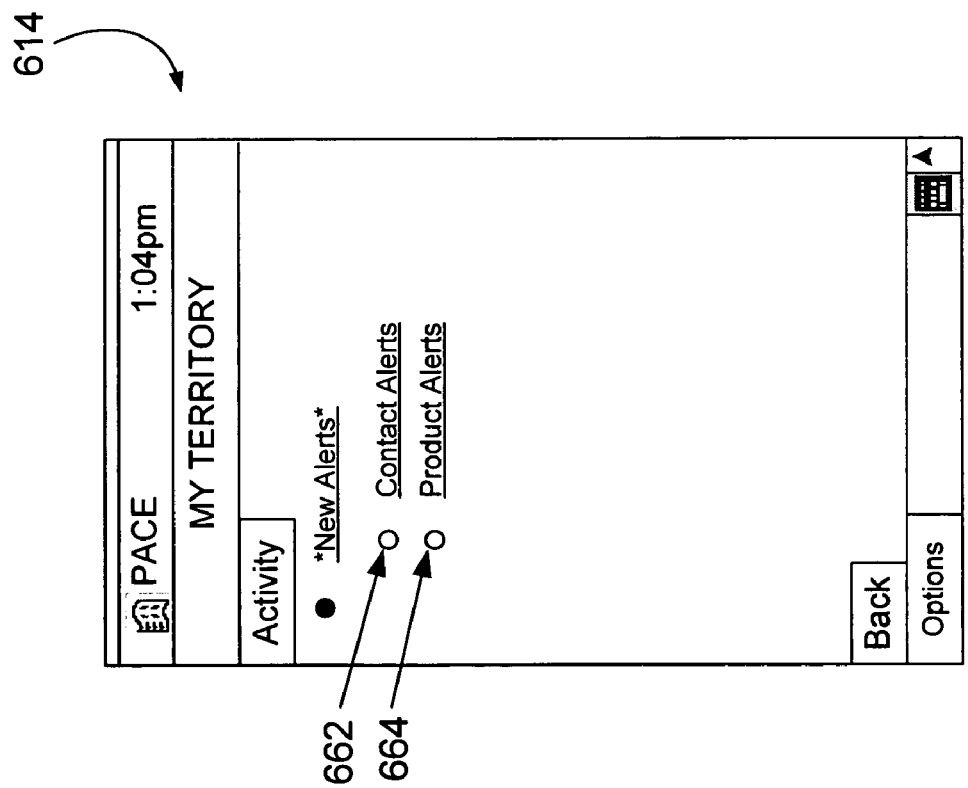
Figure 7:
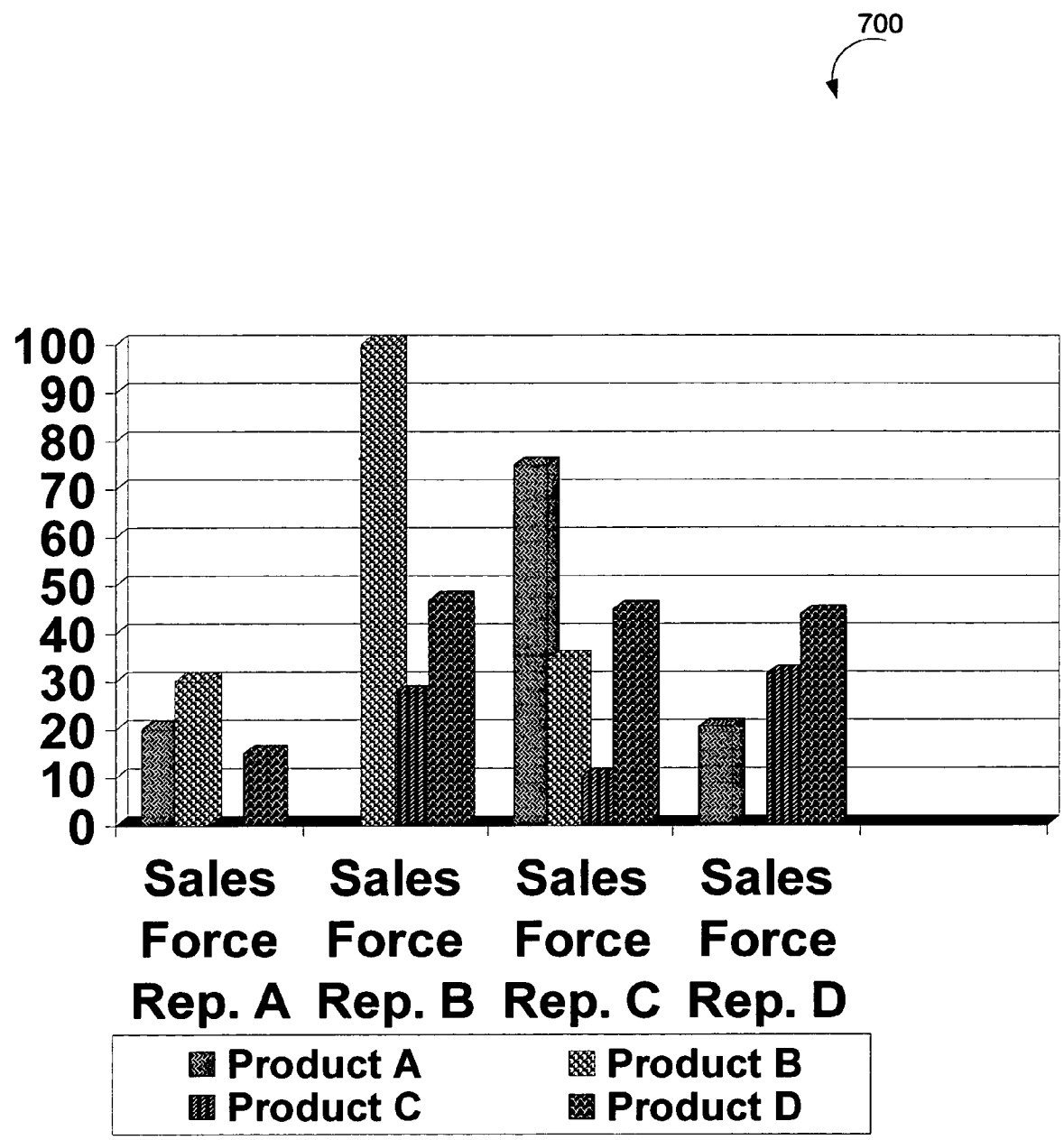

FIG. 6-7 represents an exemplary screen that may be presented to the user upon the selection of the "*New Alerts*" link 614. After clicking on the "*New Alerts*" link 614, the mobile sales force representative is presented with options related to an alert feature of the invention. These potential options comprise: "Contact Alerts" 662 and "Product Alerts" 664. The alert features are especially helpful tools in allowing the mobile sales force representative to stay in contact with their customers without forgetting about anyone.

FIG. 6-8 represents an exemplary screen that may be presented to the user upon the selection of the "Contact Alerts" link 662. After clicking on the "Contact Alerts" link 662, the mobile sales force representative is presented with an alert feature of the invention. In an exemplary embodiment of the invention, particular alerts can be programmed in order to alert the mobile sales force representatives of particular milestones. In the exemplary screen shot of FIG. 6-8, an alert 666 is provided that states, "The following customers have not been contacted in the past 90 days." Beneath the alert 666, a listing of customers 668 who have not been contacted within this period, along with the length of time since their last contact, can be provided. Mobile sales force representatives or their agencies can determine certain milestones where they would like to receive alerts based on certain criteria.

Furthermore, while not represented, information about new products or services could be provided if a mobile service provider clicks on the "Product Alerts" link 664. This feature could allow companies to promote new products to their sales force, so the sales force can inform the customers. The new product alerts could also be focused to particular customers based on the type of products the customer already sold.

While not represented, the invention can also provide exemplary screens that may be presented to the user upon the selection of the "Maintenance" link 604, "Training" link 606, "Search" link 610, and "Help" link 612. The "Maintenance" link 604 may comprise a feature to allow the mobile sales force representative to update the hardware or software of the handheld device. The "Training" link 606 may comprise a feature to allow the mobile sales force representative to view training videos or review training materials related to particular products or general sales. The "Search" link 610 may comprise a feature to allow the mobile sales force representative to conduct extensive searches for information located on the handheld device 105. Finally, the "Help" link 612 may comprise a feature to allow the mobile sales force representative to search an extensive index of help related feature on how to operate the handheld device 105.

FIG. 7 is an illustration of a bar chart 700 indicating relative sales force representative performance relating to product sales promotion to customers, generated in accordance with an exemplary embodiment of the invention. The bar chart 700 is merely illustrative and, in alternative embodiments of the invention, certain elements of the bar chart 700 can be altered, certain elements can be omitted entirely, and/or certain additional elements can be included.

As set forth above, authorized users, e.g., sales force representative agencies, can generate reports based on data collected by sales force representatives relating to product sales to customers. Handheld devices of the sales force representatives can transmit the data, e.g., via a wireless network, to a server for storage, querying, and/or report generation. By accessing a reporting module of the server, e.g., via a network, the authorized users can obtain real-time or near realtime information about the sales force representatives' performance.

Among the types of information that the authorized users can obtain is information regarding the relative performance of the sales force representatives. The bar chart 700 of FIG. 7 exemplifies one embodiment of such information. The bar chart 700 illustrates, in percentage form, the relative performance of each of four sales force representatives in promoting certain products to their respective customers. As illustrated in the bar chart 700, Sales Force Representative A is approximately 20% complete with his promotion of Product A with respect to certain customers, 30% complete with his promotion of Product B with respect to certain customers, and 15% complete with his promotion of Product D with respect to certain customers. By tracking, in real-time (or near real-time), the status of promoting certain products to customers, sales force representative agencies can maintain accurate budgets and accounting documents relating to sales of new products and the relative popularity of certain products in the marketplace.

In one embodiment of the invention, the authorized users can track sales force representative performance at the instruction/prompt level. For example, with regard to Sales Force Representative A's promotion of Product A with respect to a customer, the authorized users can determine which customers Sales Force Representative A has corresponded with concerning the new product and which customers Sales Force Representative A has not yet corresponded. Tracking performance at such a level can be particularly helpful, for example, if a sales force representative quits, is fired, is injured, or otherwise is unwilling or unable to correspond with a customer concerning a new sales product. By knowing in real-time (or near real-time) which customers have not yet heard about a particular product, the sales force representative agency, for example, can readily deploy another sales force representative to continue the promotion of the new product where the previous sales force representative left off.

It will be appreciated that the exemplary embodiments of the invention overcome the limitations of the prior art. From the description of the exemplary embodiments, equivalents of the elements shown therein and ways of constructing other embodiments of the invention will be apparent to practitioners of the art. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention as defined by the following claims. It should also be understood that the invention is not restricted to the illustrated embodiments and that various modifications can be made within the scope of the following claims.

What is claimed is:

1. A method for facilitating sales comprising the steps of:
preparing a plurality of files with a middleware server that have not been previously received by a handheld device in advance of receiving a synchronization request from the handheld device;
receiving at the middleware server a synchronization request from the handheld device containing a unique identifier for customer information on the handheld device;
receiving a file index from the handheld device at the middleware server;
comparing the file index to a file list at the middleware server;
transmitting a plurality of files from the handheld device that have not been previously received by the middleware server via a wireless network; and
transmitting a plurality of files associated with the unique identifier from the middleware server to the handheld device via a wireless network.

2. The method of claim 1, further comprising: displaying the matching records on the handheld device; and receiving current customer information with the handheld device.

3. The method of claim 1, wherein the step of receiving a synchronization request further comprises associating the unique identifier with at least one database.

4. The method of claim 2, wherein the step of displaying the matching records on the handheld device further comprises: formatting the records into predetermined categories; receiving a selection of a category by a user of the handheld device; and displaying a next level of information associated with the category.

5. The method of claim 2, wherein the step of receiving current customer information with the handheld device further comprises: formatting the current customer information with the handheld; and storing the current customer information with the handheld.

6. The method of claim 1, further comprising determining whether a wireless connection with the network is available.

7. The method of claim 1, wherein the step of transmitting a plurality of files from the handheld device that have not been previously received by the middleware server further comprises: formatting the plurality of files into a readable format at the middleware server; sending the plurality of files to a database via a file transfer protocol server; and updating the file list maintained by the middleware server.

8. The method of claim 1, further comprising transmitting the current customer information to a plurality of handheld devices via a wireless network.

9. A system for facilitating sales comprising:
a wireless network;
a handheld device operable for transmitting a synchronization request containing a unique identifier for customer information, operable for receiving a plurality of first files associated with the unique identifier for customer information via a wireless network, and operable for a transmitting a plurality of second files that have not been previously received by a middleware server from the handheld device to the middleware server via a wireless network;
the middleware server coupled to the wireless network and operable for preparing the first files in advance of receiving the synchronization request from the handheld device, receiving the second files from the handheld device that have not been previously received by the middleware server via a wireless network, and transmitting to the handheld device the first files associated with the unique identifier for customer information via a wireless network; and a file transfer protocol server coupled to the wireless network and operable for receiving current customer information from the server, and for storing current customer information in a database.

10. The system of claim 9, wherein the handheld device is further operable for displaying the matching records, and operable for receiving current customer information from a user.

11. The system of claim 9, wherein the handheld device is further operable for formatting the records into predetermined categories, receiving a selection of a category by a user of the handheld device, and displaying a next level of information associated with the category.

12. The system of claim 9, wherein the handheld device is further operable for determining whether a wireless connection with the network is available.

13. The system of claim 9, wherein the handheld device is further operable for formatting the current customer information with the handheld, and storing the current customer information with the handheld.

14. The system of claim 9, wherein the middleware server is further operable for formatting the second files into a readable format at the middleware server, sending the second files to a database via the file transfer protocol server, and updating the file list maintained by the middleware server.

15. The system of claim 9, wherein the middleware server is further operable for transmitting the current customer information to a plurality of handheld devices via a wireless network.

16. A method for facilitating sales with a handheld device comprising the steps of:

pre-staging a set of files with a middleware server that have not been previously received by a handheld device in advance of receiving a synchronization request from the handheld device, the pre-staging comprising reviewing unique identifiers associated with the handheld device based on at least one of geography and a classification of a user of the handheld device;

receiving at the middleware server a synchronization request from the handheld device containing a unique identifier for customer information on the handheld device;

receiving a file index from the handheld device at the middleware server;

comparing the file index to a file list at the middleware server; and transmitting the set of files associated with the unique identifier from the middleware server to the handheld device via a wireless network.

17. The method of claim 16, wherein the set of files is a first set of files, the method further comprising transmitting a second set of files from the handheld device that have not been previously received by the middleware server via a wireless network.

18. The method of claim 17, further comprising formatting the second set of files into a readable format with the middleware server, sending the second set of files to a database via the file transfer protocol server, and updating a file list with the middleware server.

19. The method of claim 18, further comprising transmitting current customer information to a plurality of handheld devices with the middleware server via a wireless network.

20. The method of claim 19, further comprising formatting the current customer information with the handheld, and storing the current customer information with the handheld.

* * * * *